(12) United States Patent
Ryder

(10) Patent No.: US 6,597,568 B2
(45) Date of Patent: Jul. 22, 2003

(54) CARRYING CASE FOR MOBILE OFFICE

(76) Inventor: Martin Dennis Henry Ryder, 1/44 Campbell Road, Royal Oak, Auckland 1005 (NZ)

( * ) Notice: Subject to any disclaimer, the term of this patent is extended or adjusted under 35 U.S.C. 154(b) by 87 days.

(21) Appl. No.: 09/947,573

(22) Filed: Sep. 7, 2001

(65) Prior Publication Data

US 2002/0027767 A1 Mar. 7, 2002

(51) Int. Cl.[7] .............................................. G06F 1/16
(52) U.S. Cl. ..................... 361/683; 312/223.3; 206/576; 364/708.1
(58) Field of Search ................................. 361/683–686, 361/724–727; 312/223.1, 223.6; 206/305, 320, 578, 575–576; 364/708.1; 190/110

(56) References Cited

U.S. PATENT DOCUMENTS 5,857,568 A  *  1/1999  Speirs .......................... 206/320
5,862,392 A  *  1/1999  Charkey et al. ......... 395/750.1
6,105,763 A  *  8/2000  Saetia ......................... 206/320
6,362,954 B1  *  3/2002  LeVander .................... 361/683

* cited by examiner

Primary Examiner—Darren Schuberg
Assistant Examiner—Hung Van Duong
(74) Attorney, Agent, or Firm—Young & Thompson

(57) ABSTRACT

This invention relates to a briefcase or carrying case for a mobile office, holding a number of interconnected electronic devices (laptop computer, printer, and the like) which may be opened up for immediate use of the devices. A rectangular rigid frame comprises the foundation and ancillary items are fastened to the frame. An enclosing cover having a zipper is also attached to the frame. Shock-absorbing foam and straps are included. An optional wheeled caddie can support the frame using coupling blocks on each side of the frame.

Figure 2:
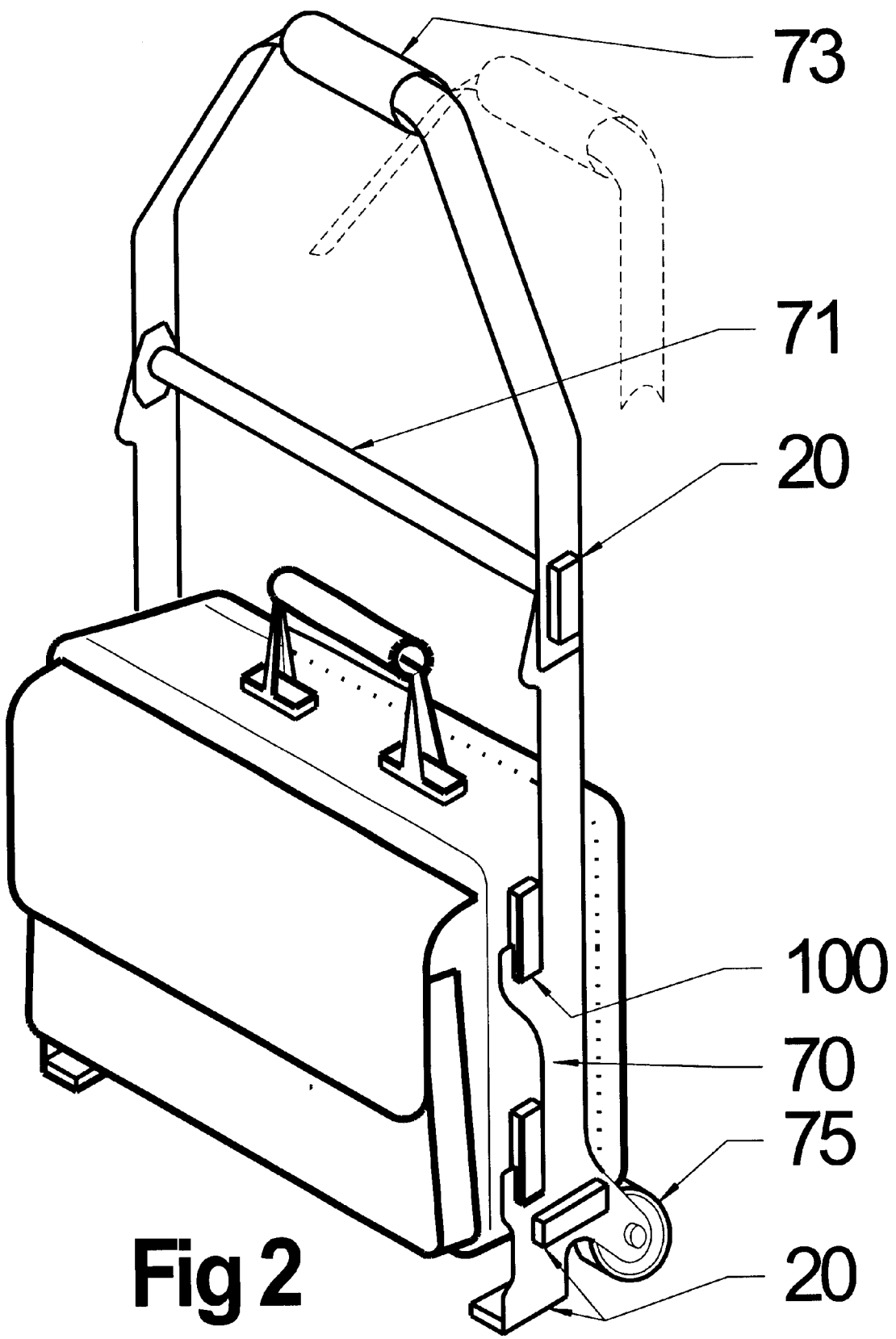

When in use, the laptop extends forward from the frame in a low flat position. The printer, held on a second hinged tray, is flipped backwards by 270 degrees over the top of the frame, so that the weight of the printer and the weight of the laptop tend to counterbalance each other and the carrying case is stable.

8 Claims, 5 Drawing Sheets

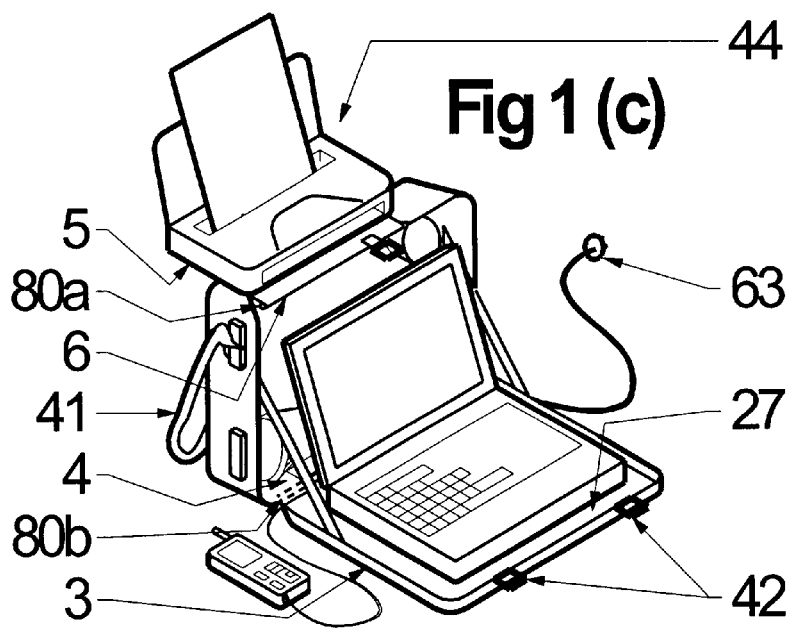
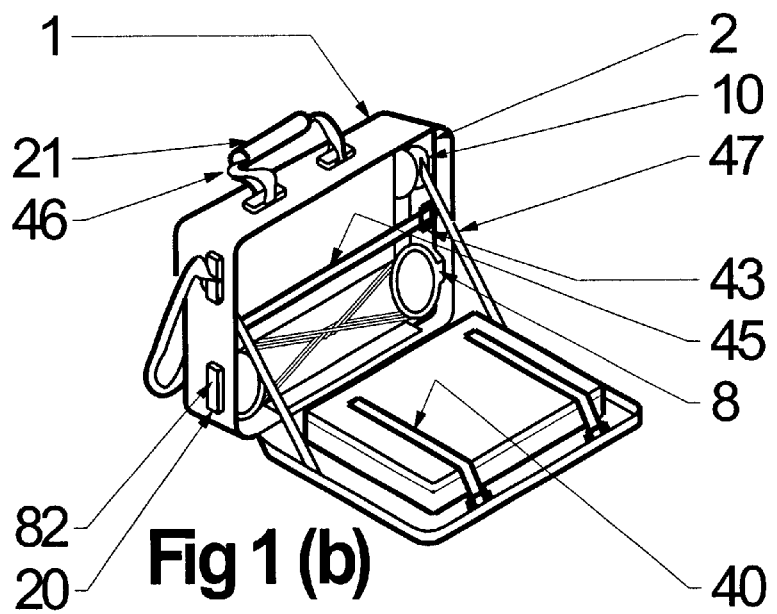
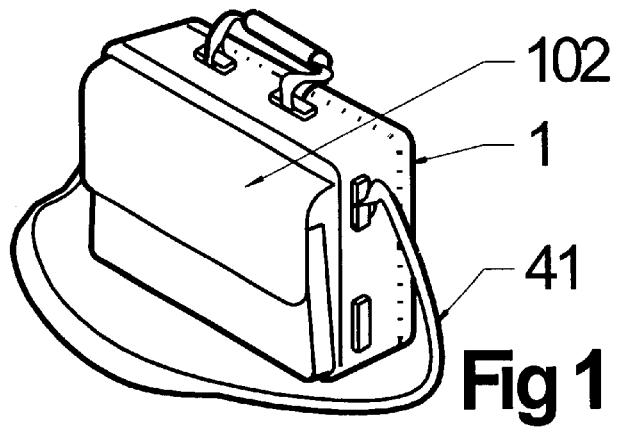

CARRYING CASE FOR MOBILE OFFICE

FIELD

This invention relates to a portable carrying case for a mobile office. The case may be closed down for transporting a number of interconnected electronic devices from place to place, and may be opened up for immediate use of those devices upon or within the frame of the carrying case.

BACKGROUND

Although laptop computers are highly convenient devices, having a number of functions within one easily transported box, at this time there are few if any convenient stand-alone, portable, standardised computers which also include a printer, a data communications link via such as the cellular telephone network, paper storage, and the like. In the absence of that, a person may carry a collection of items including separate electronic devices, interconnecting leads, and paper. The leads have to be repeatedly plugged in then unplugged for transport and in time will fail. Sometimes a vital component is lost or forgotten. Connection and disconnection takes a significant amount of time, patience, and skill. A working surface area may not be available. Yet the trend towards using mobile offices that can be brought to a client's address for an appointment, and operated (perhaps to generate orders, insurance proposals, or the like) is growing.

The problem to be solved may be described as "Provision of a mobile office within a convenient, transportable container, capable of being carried about, opened, and used with a minimum of inconvenience.

An unpublished antecedent of the instant invention included a frame, but (like U.S. Pat. No. 5,437,367 Martin) had the printer folding out on a hinged tray through 90 degrees, facing the user, and above the laptop. Rigid struts were used to hold the printer in that position. Further rigid struts held the computer tray perpendicular to the frame when in use, to resist a tendency for collapse. A complex power supply was provided to supply all equipment with the specified DC voltage and current; thus that device was locked to a certain set of electronic devices. A review of the patent literature also indicates that there have been a number of attempts to solve this problem over the last 20 years. Some prior art is summarised below:

U.S. Pat. No. 4,837,590 Sprague provides a carrying case with a hollow rectangular base and a hinged cover. A laptop is anchored on a first platform; a printer is on a second platform beside and at the same level as the laptop (with paper stored beneath). Battery storage is provided beneath the first platform. The case would be at least 500–550 mm wide.

U.S. Pat. No. 4,839,837 Chang provides a "three layered" laptop computer assembly which places a printer directly behind, and in line with the laptop when in use. If not in use the printer folds back, over the top of the closed laptop. The invention includes hinges but no protective case U.S. Pat. No. 4,929,948 Holmberg provides a transportable work station within an attache case, in which an arrangement of guide rails on internal side walls provides that a printer held above a computer is moved backward when the case is opened, into a working position. The internal side walls obstruct access to each side of the laptop.

U.S. Pat. No. 5,010,988 Brown shows a durable outer shell with shock barrier walls around a main and a secondary storage compartment. It appears that in use the laptop is considerably higher above a work surface than the printer, which is ergonomically inadvisable.

U.S. Pat. No. 5,160,001 Marceau teaches a soft briefcase-style case; the laptop is suspended within, in order to protect against shock. The case has an "opened-out mobile office mode" in that the laptop may be lifted out and operated upon an exterior flap, which when opened out exposes some office resources.

U.S. Pat. No. 5,212,628 Bradbury provides a compact workstation having its own battery and power distribution and with many optional devices,. On opening the attache case a computer tray is moved forward by levers, relative to a printer tray. However the keyboard of the laptop is lifted well above a work surface.

U.S. Pat. No. 5,214,574 Chang now adds a protective housing to the device of U.S. Pat. No. 4,839,837; an attache case having first (shallow) and second (deep) shells; a user can work the computer over the low front wall of the first shell while higher walls on the second shell enclose a tray holding a printer connected to the computer.

U.S. Pat. No. 5,217,119 Hollingsworth describes another carrying case for a laptop or other delicate instrument. This case when closed has a similar profile to that of the present invention (when closed) but provides only an aperture, accessible from above, for carrying a laptop and no provision for transformation into a mobile office.

U.S. Pat. No. 5,379,893 Ruiz holds a laptop computer within an attache case, above a partition, and it is said that the laptop is more easily used because of the elevation There is no printer.

U.S. Pat. No. 5,437,367 Martin provides a wheeled carrying case; two shell halves are hinged together. Two internal shelves each holding an electronic device may be rotated out through 90 degrees and down from the vertically opened case to be locked into position, when changing mode from a "carry" position to a "use" position. When in use the case derives some stability from the other shell half which lies alongside the working position (FIG. 2). The height of the case must be at least 500–550 mm.

U.S. design 344074 to Collins is for a suitcase holding a laptop and other compartments (resembling a font tray but the laptop is well to the rear and at one side and would be inconvenient.

U.S. Pat. No. 5,590,022 Harvey describes a compact modular portable workstation within an impact resistant carrying case. All cables to peripherals are shielded and a cellular telephone is shielded from a user. A laptop in a tray is caused to emerge by a lever when the case is opened, but it is at a considerable height above a working surface.

U.S. Pat. No. 5,717,567 Tao describes a folding rack system for a mobile office. A lower shelf is for a laptop and a second shelf is for a peripheral such as a printer. Devices may remain connected. The printer folds back over the laptop when in a carrying mode. Levers and pivots control the movement. This is like Chang (U.S. Pat. No. 4,839,837). U.S. Pat. No. 5,764,475 LeVander describes a carrying case for a mobile office, having a top-loading printer located beside a laptop computer and includes a slot in a front wall of the base of the case for paper egress. The case length must be at least 500–550 mm It can be seen that despite the presence of a number of published inventions for carrying cases applicable to mobile offices few offer a small "footprint", protection during transport, and convenient, ergonomically acceptable access.

DEFINITIONS

"Laptop-style personal computer" We shall use the term "laptop" in this specification to refer to a class of personal digital computer adapted for self-contained operation (including power storage and display device) and with a high degree of portability. Computers of this type are available from many manufacturers. The invention is not to be taken as being limited to that specific range or type of data processing devices. It may refer to a simple "dumb" terminal. Future developments may even replace the LCD screen of the laptop with a retinal projection device, while the only input used is speech, so removing the present "convenient; human-compatible size of keyboard and screen" constraint.

"Portable" refers to an ability to take something about from place to place.

"Mobile office" means an assembly including facilities for information handling, printing, scanning and telecommunications. Telecommunications includes faxes, emails, and remote access to networks (wide-area networking) as well as to the Internet. A mobile office preferably includes attributes of compactness, simple setting up and closing down and portability, so that the assembly can be carried to a place and operated at the place.

OBJECT

It is an object of this invention to provide an improved carrying case for a mobile office, or at least to provide the public with a useful choice.

STATEMENT OF INVENTION

In a first broad aspect this invention provides a carrying case for a mobile office including a set of one or more interconnected electronic devices (such as a laptop with a printer), the carrying case including a rectangular frame with a bottom, two sides, and a top, for holding and transporting the electronic devices from place to place, and which carrying case may be opened at a place for use of the one or more devices upon or within the frame, wherein a first support tray is outwardly rotatable in a first direction from a carrying position within the frame to a first limited extent of 90 degrees of rotation about a first pivotable mount along the bottom of the frame; a second support tray is outwardly rotatable from a carrying position within the frame in a second, opposing direction through a second limited extent of 270 degrees of rotation about a second pivotable mount parallel to and adjacent to the top of the frame, so that the weight of a first device held in the first tray tends to counterbalance the weight of a second device held in the second tray, so that the opened-up carrying case presents the one or more devices for use in a stable configuration.

In a first related aspect the invention provides means to limit the extent of the outward rotation of the first support tray comprises at least one inextensible cord attached between a side of the frame and a side of the first support tray.

In a second related aspect the invention provides means to limit the extent of the outward rotation of the second support tray comprises contact between the top of the frame and an underneath portion of the second support tray.

In a subsidiary aspect each pivotable mount comprises at least one hinge; a first leaf of which hinge is attached to the frame and a second leaf of which hinge is attached to the support tray.

In a third related aspect the invention provides a first tray, adapted to hold a first electronic device having at least a front, two sides, a top, and a rear; wherein the device is protected by a fixed resilient mass placed about the periphery of the device; the resilient mass being of sufficient thickness and resilience to prevent damage to the electronic device.

In a subsidiary aspect, the invention provides a carrying case for a mobile office in which a custom fitting for the first electronic device within or framed by the fixed resilient mass is obtained by a process of cutting an aperture from a sheet of resilient material.

Preferably the resilient material is a foam rubber or the like.

In a fourth related aspect the invention provides a carrying case including a set of cleats capable of holding a stowed power cable, and provides facilities for distributing electric power received through the power cable to the one or more devices.

In a fifth related aspect the invention provides a carrying case also holding internal wiring capable of interconnecting at least two devices so that data may be exchanged between the at least two devices, and so that the at least two devices do not require repeated interconnection after transport and prior to use.

In a sixth related aspect the invention provides a carrying case with a frame bearing on an outer surface thereof a plurality of blocks capable of supporting the weight of the carrying case even if loaded; wherein blocks at the sides of the frame are capable of reversible engagement with complementary notches in the frame of a wheeled caddie so that the carrying case can be coupled to the caddie and wheeled about yet no impulse forces are directly applied to the bottom of the frame.

In a seventh related aspect the invention provides a carrying case including an electrically shielded exterior bonded to the frame, so that the contents are at least partially protected from static discharges capable of damaging electronic components, and in order to minimise electromagnetic radiation during use.

Preferably the electrically shielded exterior comprises a conductive coating within the woven shell.

In an eighth related aspect the invention provides a carrying case wherein printer power passes through an intermediate series of cables including part of a data cable so that only one cable is flexed when the printer is opened out from its carrying position.

Preferably more than one conductors of a wide ribbon cable are used for each DC wire, while the remainder are used for carrying data.

In a second broad aspect the invention provides a mobile office built within a carrying case as previously described in this section.

PREFERRED EMBODIMENT

The description of the invention to be provided herein is given purely by way of example and is not to be taken in any way as limiting the scope or extent of the invention.

DRAWINGS

FIG. 1: shows the invention in its three forms: 1(*a*) is the invention closed up and able to be carried; 1(*b*) is the invention opened but not yet opened out for use, and 1(*c*) is in the opened-out form suitable for use as a mobile office.

FIG. 2: shows the invention, held on a frame with wheels and a handle to assist transport over extended distances.

Figure 3:
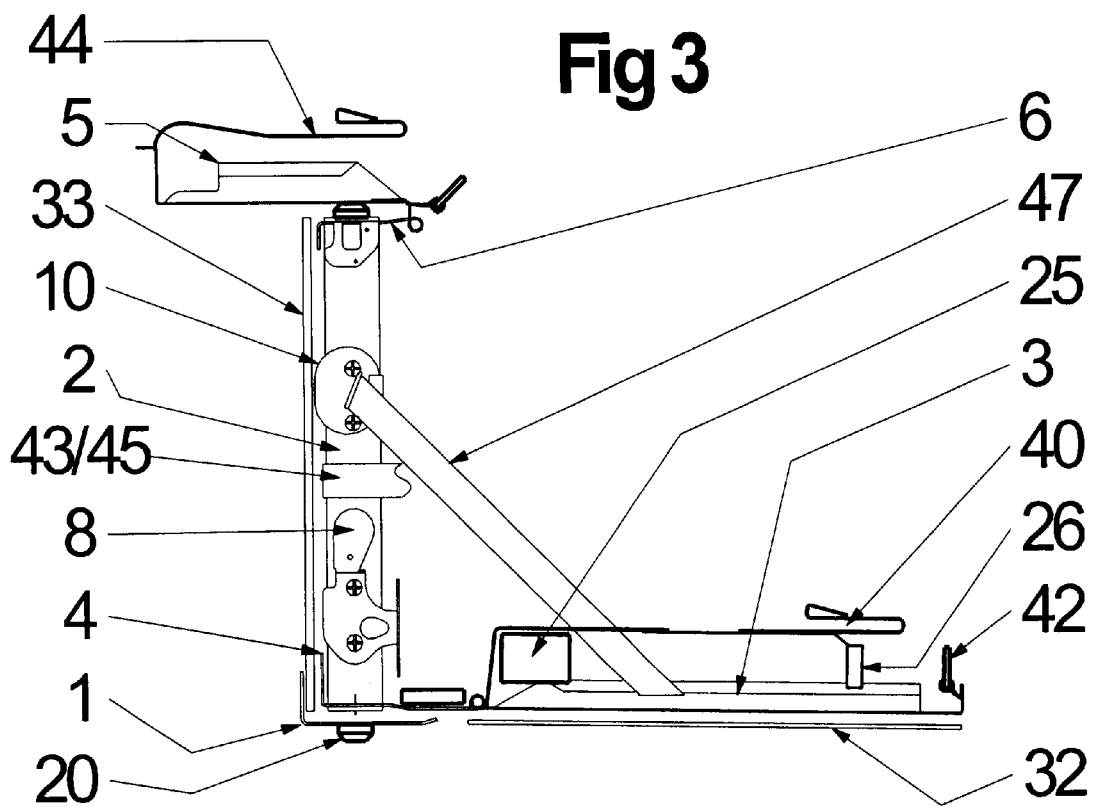

FIG. 3: is a side view of the invention in an opened-out mode, showing fittings fastened to the interior of the frame, the computer in its horizontally aligned tray at the base of, and extending in front of the frame, and the printer tray horizontally aligned above and extending behind the top of the frame.

Figure 4:
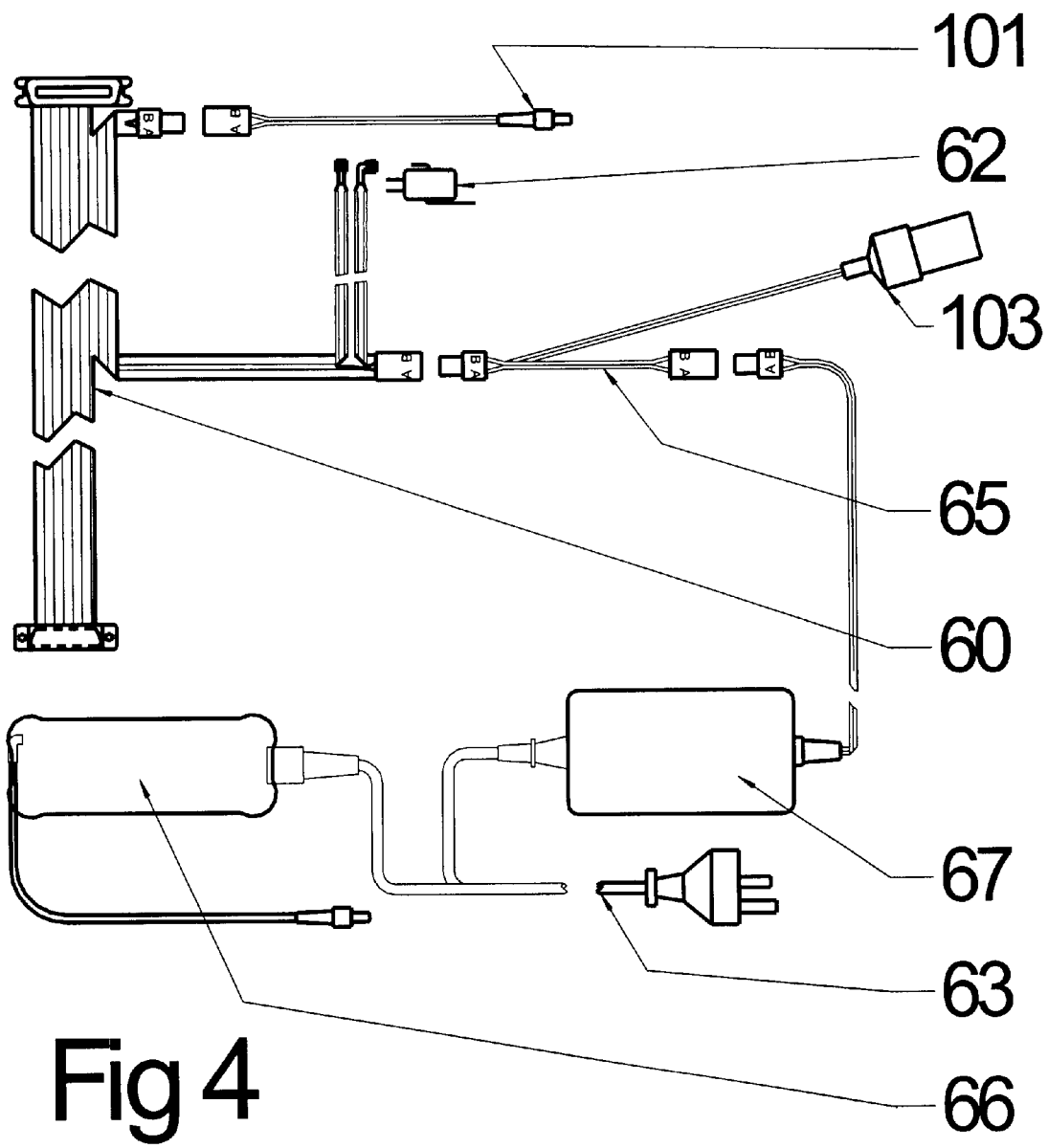

FIG. 4: shows an example layout of supply power wiring within the case.

Figure 5:
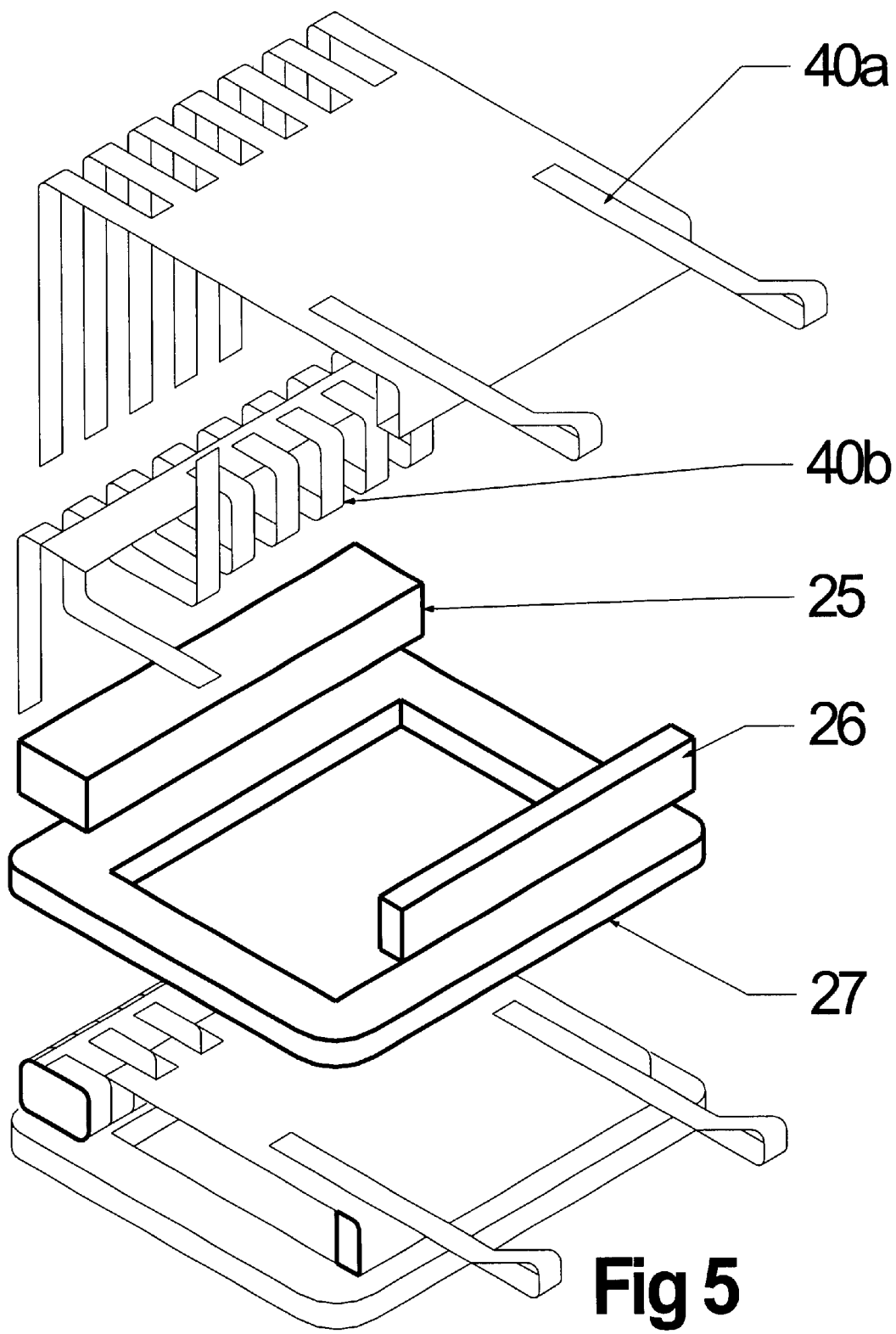

FIG. 5: shows an example arrangement of foam pads, straps, and a shroud used for protection of the laptop computer.

This invention comprises a portable carrying case for a mobile office, having two modes: a "carrying mode" and a "use mode". The carrying case can be held by means of the handle 46 (FIG. 1b), or a shoulder strap (41). Optionally, a wheeled dolly is provided (FIG. 2). In both modes, the mechanical components of the invention support the electronic devices (typically including a laptop computer or other portable form of personal computer and various peripherals such as a printer or a LCD data projector) in either a protected configuration suitable for transport (FIG. 1a, FIG. 2), or in an accessible, opened-out configuration (FIG. 1c, FIG. 3) when the mobile office is to be used. Required electrical interconnections are maintained undisturbed between configurations so that a user is not required to engage in technical operations before and after use of the mobile office at a place. Generally, the mobile office will be connected to a mains socket during use although individual internal or external batteries may be relied on. The invention has a skeleton; a rectangular metal frame (2) to which other components are directly or indirectly attached. An outer protective layer comprises a woven polyester shell (1) having a zipper around three sides near one edge.

Transition between the carrying and the use mode is made by unzipping the shell, then rotating into a use position two holding trays (3 and 5) which are suspended from the frame by hinges (80b, 80a). Inextensible straps (e.g. 40, 40b, 47) made of a woven plastics material (polyester) are used either to restrain electronic devices during carriage or to limit the movement of hinged modules. Some restraining straps may be extended or shortened in order to accommodate electronic devices of various sizes.

The Example can be described in terms of its component parts. A rectangular open-sided rigid frame (2), is (in our example) 360 mm high×410 mm wide and is made of aluminium strip 3 mm thick and 40 mm wide. This frame comprises the foundation of the invention. Like other metal parts used herein it is powder coated in black. Other components are directly or indirectly fastened to this frame. The table space or footprint required by this example when in use is therefore about 410 mm wide and about 360 mm deep.

When in the carrying mode, this frame encloses the electronic devices comprising the mobile office. A "backplane" (33) sheet of an impact-resistant material such as bilayered polycarbonate (6 mm), and a stiffener sheet (32) (similar material, 3 mm thick) attached below the computer tray (3) provide front and rear covers for the space surrounded by the frame (2). In turn, the frame and the stiffeners are protected by an outer black woven shell (of polyester in the Example); held in place by being passed beneath the various plastics blocks (20) crewed down over the exterior of the frame. The under-frame set of blocks serve as buffers as when used on a table top so may be made of, or covered with, a softer, more resilient material. Blocks (20) on each side are positioned so as to engage with notches (100) formed in the frame (70) of the wheeled (75) caddie (see FIG. 2). The caddie includes an adjustable handle (73) as well as a stiffening bar (71) which can also be used as a handle when the assembly is to be carried at a height.

Although the handle of the carrying case is shown in FIGS. 1a and 2 as a rigid fitting, in practice we prefer to use either a flexible strap 46 passing through a tube 21 (as shown in FIG. 1b) so that it may lie flat and does not obstruct movement of the printer tray (5), or a folding handle.

Both the printer and the laptop computer, being large, expensive, and delicate, require protection from impact when in the carrying mode. Apart from the backplanes, printer restraint is provided for during carriage by a woven polyester strap (45) passing across the top of the printer and anchored at each end to the sides of the frame. The strap includes length adjustment means and a quick-release buckle (43). The printer is always held on to a printer tray (5) typically by a strap (44) although that depends on the make and model of the printer. One preferred model is the "Canon BJC 85", a portable ink-jet printer with a built-in sheet feeder and optional document scanner (a replacement for a print head). The printer tray is attached to the top of the frame by a hinge (80a, 6) capable of allowing an upper edge of the tray to rotate through 270 degrees between an internal, carrying position, and an opened-out position. In the opened-out position the printer lies over the top of the frame and towards the rear of the mobile office as shown in FIGS. 1(c) and 3, pressing on to a block (20). Note in the side view of FIG. 3 that the axis of the hinge (80a, 6) is extended to one side of the frame, partly so that the printer during carriage lies within and to the back of the space inside the frame, and partly so that during use the weight of the printer is supported on the top of the frame through the block 20. Conveniently, an electrical switch (microswitch 62; FIG. 4) may be mounted inside the frame in order to disconnect the printer power when the printer is in its closed position. (Although some printers automatically become live only when an incoming job is detected, others are less intelligent. There may be instances where printing is not required and so the user has left the printer in its carrying position).

Laptop restraint is illustrated in FIGS. 3 and 5. Restraint during carriage and prior to opening the lid of the laptop is provided for by two straps (40) fastened to a flexible shroud (40a) which covers the closed laptop printer and anchored at one end by a plurality of tapes to slots in the rear of the tray (3). Each strap 40 is attached to the shroud and has a "Velcro" upper surface at that part. Each strap passes through a quick-release buckle (42) close to the front end of the tray and can be folded back so that a complementary "Velcro surface on the end of the strap can be used to affix the strap in a reasonably tight state. The computer is held firmly in relation to sideways movement within the computer tray (3) by a closely fitting "frame" cut to suit the specific device from a sheet of resilient plastics foam (27); and at least one further block of foam (25) lies behind the computer to assist in absorbing shock during carriage. This block is held in place by an assembly of straps (40b) anchored to the frame. This block should be large enough to adequately cover any connectors plugged into the rear of the computer. A risk in carrying a plugged-in laptop is that a force incident on a connector body may be transferred through the connector into the motherboard of the machine and cause irreparable damage. Another block (26) lies in front, located within the front portion of the shroud. The computer can be lifted up from the foam if for example access to connectors or disk drives is needed. Side ventilation apertures remain open. During use, the computer tray (3) opens to the front of the frame though still held to the frame by a hinge (80b) capable of allowing a rearward edge of the tray to rotate through 90 degrees between an internal vertical carrying position, and an opened-out horizontal position. Two straps (47) tied to the frame by anchors (10) limit the opening of the computer tray to about 90 degrees of rotation preventing the computer and tray from falling further. The laptop screen is able to be folded back at a usual working angle behind the keyboard during use, as shown in FIG. 1(c). In use, the keyboard is only about 3–4 mm higher above a work surface than it would be if it had been taken out and used on the work surface, which height is ergonomically acceptable.

In the opened-out mode, the weight of the printer (to the rear) and the weight of the laptop (to the front, conducted to the frame by the straps (47)) tend to counterbalance each other so that much of the weight of the mobile office falls onto the rubber feet 20. These straps become tense when the printer is brought into use. As a result, the carrying case is tolerant to variations of weight owing to different types of electronic device, such as a much lighter laptop. The system does not collapse if for example the printer is not folded out for use. The case may include pockets (under the flap 102, see FIG. 1(a) for storage of paper, pens, business cards, and reference files.

The steps required to open up a mobile office carried within this carrying case include:

1. Placement on a working surface such as a table.
2. Unzipping the shell (1)
3. Fold the computer tray (3) forwards to the open position.
4. Remove the printer restraining strap (45) using the buckle (43).
5. Rotate the printer on its tray (5) forwards then upwards and backwards to the operating position.
6. Remove the shroud and tapes (40) from over the laptop and open up the laptop for use.
7. Unravel the power cable (63) (if required) from the cleats (8); also the phone/data cable, (if required) and plug them in.

The deployment process should take less than one minute.

Optionally the mains input cable (63) may be connected to an inverter output driven from a car battery; perhaps within a vehicle. The carrying case includes no general storage battery although many electronic devices include their own which may be recharged from the mains when it is connected. I prefer that the power packs (66, 67) either supplied with, or suitable for, the specific items of electronic devices used are included in the carrying case, for simplicity and in order to avoid compromising a warranty through having run equipment outside its manufacturer's specifications. The power packs may be held in place within the frame using straps threaded through slots in the frame and buckles or "Velcro". This approach to power supplies minimises weight and complexity over a prior-art approach providing a custom power supply for a given set of devices. Nevertheless it may still be convenient to provide a rechargeable battery array (12 V being suitable for the preferred Canon printer).

Although the carrying case for a mobile office may be sold to an end-user it can also be supplied to a computer assembler to build up as required to suit specific combinations of devices when making up a turnkey mobile office. Most adjustments for fitting are made simply by means of cutting foam and threading or adjusting straps. An electrician should be commissioned to connect up the mains cable and supply wiring, as per FIG. 4, so that legal regulations are satisfied.

The power connectors (eg 101) as originally supplied with the electronic devices are retained. Note that the printer power, as shown in FIG. 4, passes through an intermediate series of cables including part of a data cable 60. The combined printer data and power cable formed from ribbon cable allows flexibility and fits unobtrusively within the case structure. The DC printer power cord as supplied is cut, and polarised DC connectors (here indicated as "AB") are used in a series on a cable (65) to take the printer power from a power pack 67 conveniently placed (and held down with straps and "Velcro") in the base of the frame up to the printer plug 101. Conveniently a number of slots and holes are cut into the frame so that straps can be attached at many or most sites in order to meet the needs of a particular system. This account of the provision of electric power distribution is included to illustrate the suitability of this carrying case for use as a housing for a mobile office. Cleats (8) for stowing cables to be held within the mobile office are included as part of the invention, although the electrical and electronic parts themselves would usually be incorporated at the time of building up a system within the carrying case. For example, power packs 66, 67 etc are usually, but not always, provided by the manufacturers of the electronic devices used.

VARIATIONS

The carrying case may be used for devices unrelated to a mobile office per se, such as communications test equipment, medical diagnostic equipment (such as ultrasound, ECG, EEG), and computer diagnostic equipment. Many of these can make use of a printer.

Data cables may not be needed if data can be moved between devices within the carrying case through wireless devices such as infra-red or radio links.

Connection for data from the laptop through a mobile (cellular) telephone to a public network is provided according to the prevailing technical requirements (serial link, RF, or the like). FIG. 4 includes an optional telephone charger plug (off 65) and there is space within the carry case to accommodate a mobile telephone and charger.

The caddie may be attached by means other than blocks; for example wing nuts or other screw fasteners.

COMMERCIAL BENEFITS or ADVANTAGES

Availability of this bag or carry case facilitates adoption of a "mobile office" which may partially replace the "city office" in favour at present. The construction of the case allows a set of devices (such as a portable computing device or laptop, a portable printing or scanning device, and a wireless data transfer device or mobile phone) to be transported as a set and used together with much greater convenience and protection than a conventional carry bag, and without having to disconnect power and data connections when transporting the equipment.

Many low-voltage (digital-type) connectors and adjacent cables are likely to fail after perhaps only a few hundred insertions and removals.

The weight of the carry case is of the order of 2.5 to 3 Kg, but could be reduced.

The structure of the case provides good protection to the enclosed devices.

The mobile office may be set up or put away in less than one minute, whereas connecting and using separate devices may take 5 minutes or more.

This example of a mobile office needs no complex mechanical devices such as rigid arms, gas struts, or guides.

The optional wheeled caddie allows the weight of the assembled mobile office to be supported for an extended journey, and reduces the risk of dropping the devices as by a tired person.

The bag or carry case can be sold as a kit of parts to a computer dealer for custom assembly so that a purchaser can buy a custom set of devices within a carry bag, as a "turnkey" mobile office. Further, the kit of parts can be shipped in a compacted form.

The case contains provision to install a power supply or supplies allowing one or more of the computer, printer, scanner and phone to be powered or charged from an external power source via one connecting cable. The laptop, printer/scanner and mobile telephone may or may not include rechargeable batteries. In general, included batteries provide between one and three hours of operation (less if continuous wireless connection is maintained). Any person working for a longer period will need an external power source. Weight is saved by using just a single power cable.

The case may be electrically shielded as by metallising and bonding the shell, the backplane and the sheet beneath the computer tray to the frame, partly to minimise radiated electromagnetic interference when in use, and partly to reduce susceptibility of the devices within the mobile office to static discharge as from lightning or friction on a carpet. The shell may be sprayed from within with a metallic spray such as one including particles of metal, or a wire may be woven into the fabric of the shell.

Finally, it will be understood that the scope of this invention as described and/or illustrated within this provisional specification is not limited to the preferred embodiments described herein for illustrative purposes. Those of skill will appreciate that various modifications, additions, and substitutions are possible without departing from the scope and spirit of the invention as set forth in the following claims.

I claim:

1. A carrying case for a mobile office including at least two interconnected electronic devices (such as a laptop and a printer), the carrying case including a rectangular frame with a bottom, two sides, and a top, for holding and transporting the electronic devices from place to place, and which carrying case may be opened at a place for use of the one or more devices, characterised in that a first support tray is outwardly rotatable in a first direction from a carrying position within the frame to a first limited extent of 90 degrees of rotation about a first pivotable mount mounted parallel to and along the bottom of the frame; a second support tray is outwardly rotatable from a carrying position within the frame in a second, opposing direction through a second limited extent of 270 degrees of rotation about a second pivotable mount parallel to and adjacent to the top of the frame, so that the weight of a first device held in the first tray tends to counterbalance the weight of a second device held in the second tray, so that the opened-up carrying case presents the one or more devices for use in a stable configuration.

2. A carrying case as claimed in claim 1, characterised in that means to limit the extent of the outward rotation of the first support tray comprises at least one inextensible cord attached between a side of the frame and a side of the first support tray.

3. A carrying case as claimed in claim 1, characterised in that means to limit the extent of the outward rotation of the second support tray comprises contact between the top of the frame and an underneath portion of the second support tray.

4. A carrying case as claimed in claim 1, characterised in that the first tray is adapted to hold a first electronic device having at least a front, two sides, a top, and a rear; the device being protected by a fixed resilient mass placed about the periphery of the device; the resilient mass being of sufficient thickness and resilience to prevent damage to the electronic device.

5. A carrying case as claimed in claim 1, characterised in that the carrying case includes a set of cleats for stowing at least one cable.

6. A mobile office built within a carrying case as claimed in claim 1.

7. A carrying case as claimed in claim 5, characterised in that the carrying case also holds internal wiring capable of interconnecting the at least two devices so that data may be exchanged between the devices, and so that the devices do not require repeated interconnection after transport and prior to use.

8. A carrying case as claimed in claim 7, characterised in that the frame of the carrying case has attached to an outer surface thereof a plurality of blocks capable of supporting the weight of the carrying case; wherein blocks at the sides of the frame are capable of reversible engagement with a wheeled caddie so that the carrying case can be wheeled about on the caddie and no impulse forces are directly applied to the bottom of the frame.

* * * * *